United States Patent [19]

Teichner

[11] Patent Number: 5,103,296
[45] Date of Patent: Apr. 7, 1992

[54] COLOR TELEVISION SYSTEM HAVING ADAPTIVE FILTERS IN THE TRANSMITTER ENCODER AND IN THE RECEIVER DECODER

[75] Inventor: Detlef Teichner, North Salem, N.Y.

[73] Assignee: U.S. Philips Corporation, New York, N.Y.

[21] Appl. No.: 516,889

[22] Filed: Apr. 30, 1990

[51] Int. Cl.$^5$ .............................. H04N 9/78
[52] U.S. Cl. .......................... 358/31; 358/16
[58] Field of Search .................. 358/16, 31, 36

[56] References Cited

U.S. PATENT DOCUMENTS

| 4,345,268 | 8/1982 | Clarke | 358/31 |
| 4,656,502 | 4/1987 | Hansdörfer | 358/16 |
| 4,688,080 | 8/1987 | Wagner . | |
| 4,754,322 | 6/1988 | Okuda et al. | 358/37 |
| 4,893,176 | 1/1990 | Faroudja | 358/16 |

FOREIGN PATENT DOCUMENTS

| 62-98883 | 5/1987 | Japan | 358/31 |
| 63-224494 | 9/1988 | Japan | 358/31 |
| 1-180196 | 7/1989 | Japan | 358/31 |
| 2066615 | 7/1981 | United Kingdom . | |
| 2170975 | 8/1986 | United Kingdom | 358/31 |
| 2173668 | 10/1986 | United Kingdom | 358/31 |

OTHER PUBLICATIONS

A Progress Report on Improved NTSC, Faroudja et al, SMPTE Journal, Nov. 1989, pp. 817-822.

Primary Examiner—James J. Groody
Assistant Examiner—Kim Yen Vu
Attorney, Agent, or Firm—Leroy Eason

[57] ABSTRACT

A color television system wherein the transmitter and receiver each include at least one adaptive filter for minimizing crosstalk between the frequency interleaved luminance (Y) and chrominance (C) components of a received video signal due to vertical changes in luminance or chrominance on successive scanning lines of the video picture. Each such adaptive filter includes a line comb filter which comb-filters from the input signal thereto frequencies which belong to one of the video signal components, and a fading circuit for combining the comb-filtered signal with the unfiltered signal in continuously variable relative proportions. Such proportioning is established by an adaptive control signal derived from a vertical detection signal which corresponds to the degree of vertical correlation of luminance and/or chrominance of vertically corresponding pixels on successive scanning lines. Crosstalk between the luminance and chrominance signals is thereby minimized consistent with retention of high frequency components thereof which provide fine detail in the video picture.

10 Claims, 11 Drawing Sheets

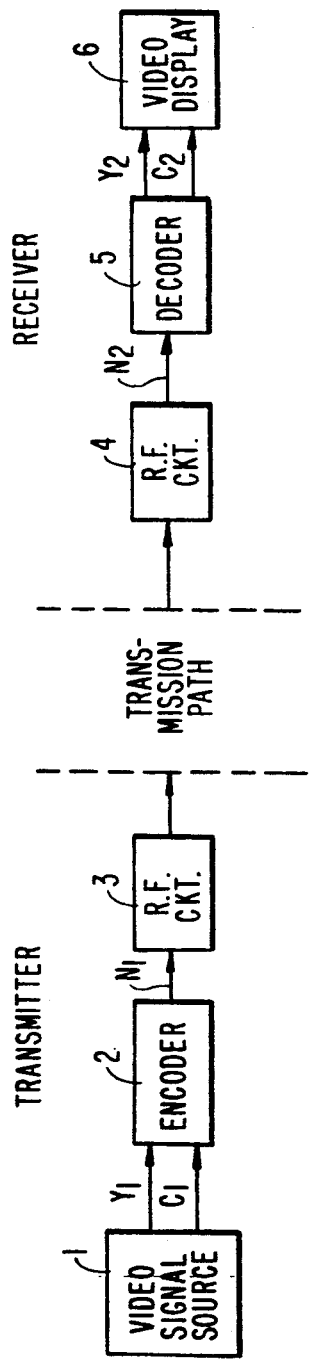
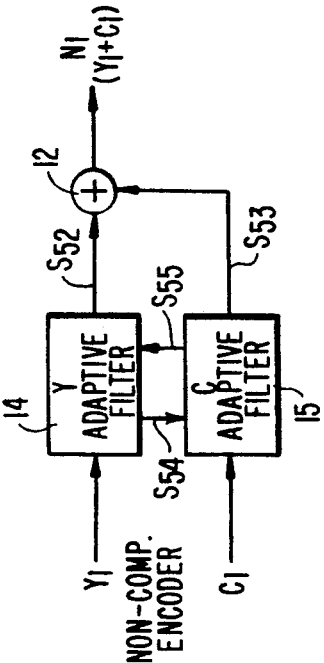
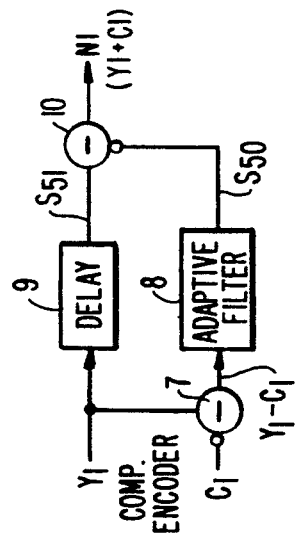
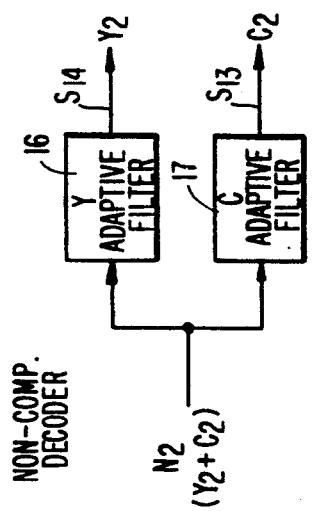

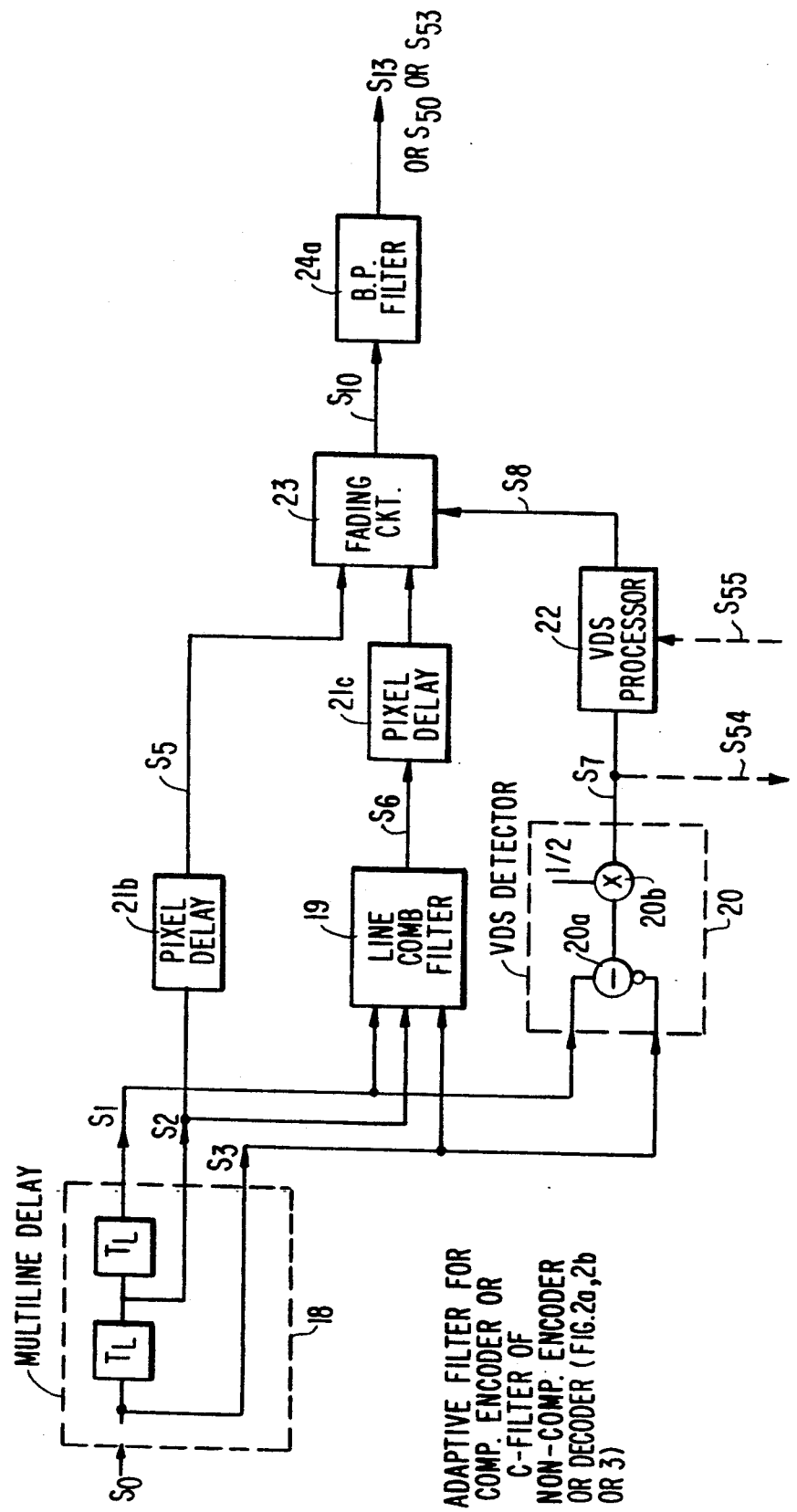

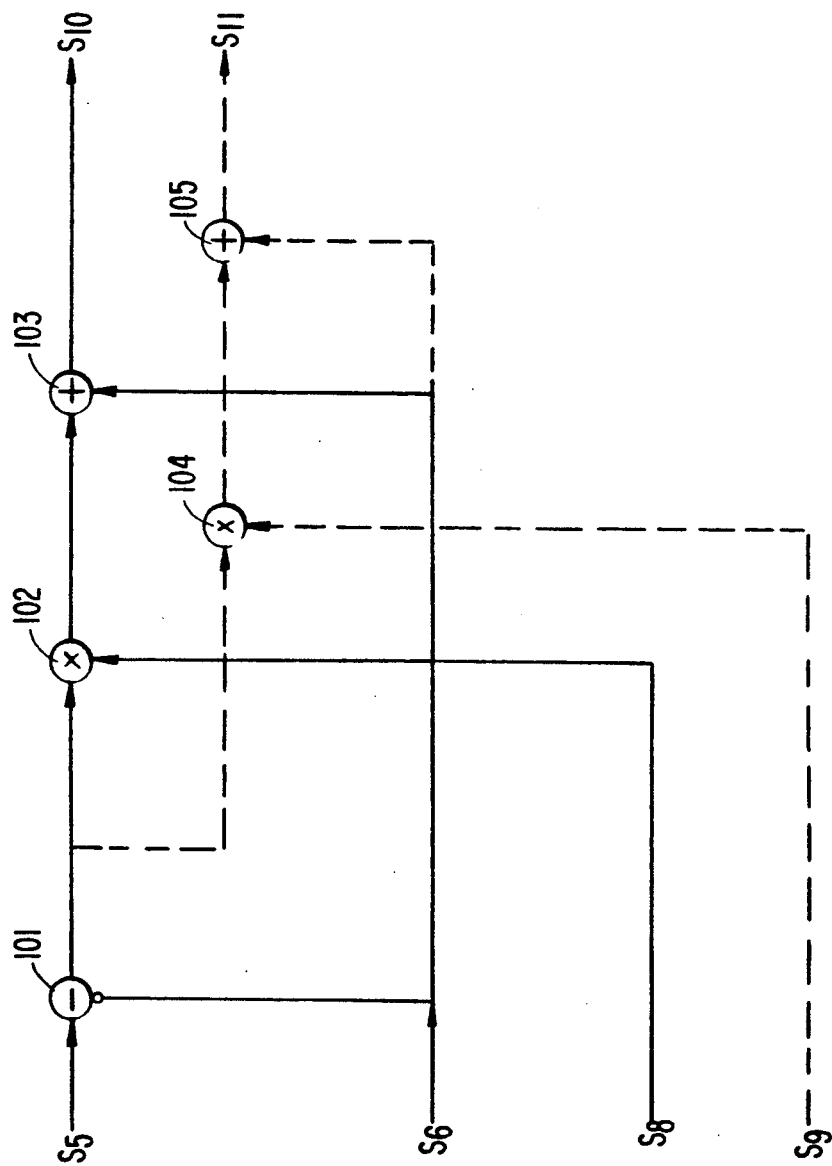

COLOR TELEVISION SYSTEM HAVING ADAPTIVE FILTERS IN THE TRANSMITTER ENCODER AND IN THE RECEIVER DECODER

BACKGROUND OF THE INVENTION

1. Field of the Invention

The present invention relates to a color television system which maintains high definition together with significantly reduced crosstalk between frequency interleaved luminance and chrominance components of a received video signal, and particularly to such a system wherein at both the transmitter and receiver comb filtering is employed to a variable extent corresponding to the variation in vertical correlation of luminance and chrominance on successive scanning lines of the video picture, thereby minimizing crosstalk without loss of high frequency components of the luminance and chrominance signals which provide fine detail in the video picture.

2. Description of the Related Art

Existing standards for broadcast television were originally developed for monochrome transmission. However, in order to maintain compatibility with present and contemplated higher definition color television, as required by national regulatory authorities, the frequency band of the chrominance component of the composite color video signal overlaps the upper portion of the frequency band of the luminance component. This is achieved by frequency interleaving, which is possible if the luminance signal substantially only includes frequencies which are clustered at even harmonics of half the line scanning frequency, so that the frequency components of the chrominance signal can be placed there-between by transmitting the chrominance signal in the form of amplitude modulation of a subcarrier wave at an odd multiple of half the line scanning frequency. In the NTSC system, relative to the frequency of the carrier of the complete video signal the color subcarrier is at about 3.5 MHz, the luminance (Y) signal extends to 4.2 MHz, the sidebands of the Q component of the modulated chrominance signal extend 0.5 MHz to each side of the subcarrier, and the sidebands of the I component of the modulated chrominance signal extend from 1.5 MHz below to 0.6 MHz above the subcarrier. The subcarrier wave itself is suppressed in the transmitted video signal.

Formation of the transmitted video signal from the original RGB signals from a video camera is referred to encoding, and recovery of the RGB signals from the received video signal at the receiver is referred to as decoding. The decoding operation includes separating the modulated chrominance signal from the luminance signal, which has most commonly been effected by bandpass filters. However, that inevitably loses luminance detail since it is comprised in the upper portion of the luminance band which is overlapped by the chrominance band and so will be separated with the chrominance signal. This also results in crosstalk between the luminance and chrominance signals, producing effects in the received video picture known as "cross-color" and "cross-luminance", or more popularly as "rainbow" and "dot" patterns, respectively.

It is therefore preferable to effect decoding of the video signal by comb filtering, employing line, field or frame delays for that purpose. Such filtering presumes, as a result of interleaving of the luminance and chrominance signal frequency components, that the phase of the luminance signal will remain substantially the same on successive scanning lines during successive fields of the video picture, whereas the phase of frequency components of the chrominance signal will alternate on successive scanning lines of successive fields, requiring four fields (1/15 seconds) to repeat. However, such vertical phase relationships between the luminance and chrominance signals are only true in regions of the video picture having a high degree of vertical correlation, i.e. no substantial changes in the vertical direction from line to line. If there are vertically stepped or diagonal shapes in the picture, the frequency components of the luminance and chrominance signals will not be respectively clustered only at even and odd harmonics of half the line scanning frequency, and will overlap to an extent dependent on such departure from vertical correlation in the picture. In such cases, comb filtering would result in loss of high frequency components of the luminance and chrominance signals, with consequent loss of detail in the picture.

Various methods have been proposed to provide comb filtering of the interleaved luminance and chrominance signals while minimizing loss of detail. For example, U.S. Pat. No. 4,688,080, issued Aug. 18, 1987, describes an adaptive chrominance separation circuit wherein a comb filtered chrominance signal is provided for portions of the video picture having high vertical correlation, a lowpass filter otherwise being employed to separate the luminance and chrominance signals. Since luminance detail is above the passband of such a filter, in order to preserve such detail the aforesaid patent teaches to make the decision to either bypass or not bypass the comb filter depend not only on the presence of vertical chrominance detail but also on the presence of luminance detail. However, such adaptation is only an approximation based on certain discrete levels of the changes in the chrominance and luminance signals on successive scanning lines. Such patent also teaches to switch between a combed and a bandpass filtered chrominance signal, and to provide an average of the two during switching from one to the other. However, there is no adaptation of the relative proportions of said signals in accordance with the degree of vertical correlation in the video picture.

Applicant's own published article "Adaptive Filter Techniques for Separation of Luminance and Chrominance in PAL TV Signals", *I.E.E.E. Trans. on Consumer Electronics*, Vol. CE-32, No. 3, August 1986, describes an adaptive filter for separation of luminance and chrominance which effects a continuously variable transition between line comb filtering and frame comb filtering depending on the degree of vertical change in the picture from frame to frame or from line to line caused, for example, by movement in the picture. Movement adaptive "fading" between frame and line comb filtering is thereby achieved to provide luminance-chrominance separation to an extent consistent with preservation of high frequency detail.

The article "Some Thoughts on Using Comb Filters in the Broadcast Television Transmitter and at the Receiver" by R. Turner, *I.E.E.E. Trans. on Consumer Electronics*, Vol. CE-23, No. 3, August 1977, describes comb filtering at the receiver as well as at the transmitter so as to exclude frequency components in the transmitted video signal which are not clustered at either even and odd harmonics of half the line frequency. That renders the comb filtering at the receiver more effective in regions of the picture having low vertical correlation, such as diagonals, but excessive exclusion of other frequency components of the video signal will cause noticeable degradation of vertical resolution in the picture. Best results are achieved if the transmitter encoder and receiver decoder employ the same type of comb filtering, such as by line or by frame. However, crosstalk will still occur because with comb filters having a reasonable number of line and frame delay elements there will be some overlap of the luminance and chrominance passband slopes of the filter. Such overlap will also result in loss of vertical resolution.

SUMMARY OF THE INVENTION

The present invention provides a color television system wherein adaptive line comb pre-filtering is employed at the transmitter for the luminance and chrominance signals, and adaptive line comb post-filtering is employed at the receiver to recover and separate such signals from the received composite video signal. The filter adaptation is such that chrominance and luminance separation is effected entirely by comb-filtering for portions of the video picture in which there is a high degree of vertical correlation of luminance and chrominance of corresponding pixels on successive scanning lines, exceeding a predetermined level, and is effected entirely by bandpass filtering when there is essentially no vertical correlation. Between those extremes, where there are intermediate degrees of vertical correlation, a continuously variable proportioning or "fading" is provided between line comb filtering and bandpass filtering for both the luminance and chrominance signals. The fading proportion is established by an adaptive control signal (ACS) derived from a vertical detection signal (VDS) corresponding to the degree of change in the luminance and chrominance signals for corresponding pixels on successive scanning lines. Since the same type of fading and the same luminance and chrominance passbands are employed for pre-filtering at the transmitter and post-filtering at the receiver, coordination between the transmitter and receiver is achieved without any necessity for transmission of a common control signal for that purpose. The pre-filtering significantly reduces crosstalk between luminance and chrominance in the transmitted signal, so that the subsequent post-filtering at the receiver results in far more effective reduction in crosstalk than has heretofore been possible without significantly reducing picture resolution.

A color television system in accordance with the invention comprises a transmitter which includes an encoder for combining the luminance (Y) and chrominance (C) signals to form the transmitted video signal, and a receiver which includes a decoder for deriving the Y and C signals from the received video signal. The encoder comprises at least one adaptive filter to which one of the Y and C signals is supplied as an input, and the decoder comprises at least one adaptive filter to which the received video signal is supplied as an input. Each of such adaptive filters comprises a multi-line delay for receiving the input signal to the filter and deriving therefrom respective line signals corresponding to respective ones of a plurality of successive scanning lines of the video picture. A line comb filter derives from such line signals a comb filtered signal which only includes those frequency components of the line signals having a particular phase relationship on the successive scanning lines, such as alternating in phase or remaining of the same phase. In the case of high vertical correlation of the line signals, phase alternation is characteristic of the C signal component and constant phase is characteristic of the Y signal component. The filter also comprises a fading circuit for receiving the comb-filtered signal and one of the line signals and combining them in variable relative proportions to derive a corrected signal, such variable proportioning ranging from a corrected signal consisting of only the comb-filtered signal and a corrected signal consisting of only said one line signal. A detector circuit derives from the line signals a vertical difference signal (VDS) of a magnitude corresponding to the degree of vertical correlation of the line signals, and a processor circuit derives from the VDS signal an adaptive control signal (ACS) which controls the fading circuit to set the relative line signal in accordance with the magnitude of the ACS signal. Via a bandpass filter such one line signal is then combined with the corrected signal from the fading circuit to derive an output signal which is equivalent to such one line signal comb-filtered to an extent consistent with the degree of vertical correlation of pixels on the scanning lines to which the successive line signals correspond.

BRIEF DESCRIPTION OF THE DRAWINGS

A more complete description of the invention and various embodiments thereof is presented below with reference to the accompanying drawings, in which:

FIG. 1 is an overview of a color television system in accordance with the invention;

FIG. 2a is a block diagram of a complementary form of the encoder in FIG. 1, and FIG. 2b is a block diagram of a non-complementary form of such encoder;

FIG. 3 is a block diagram of a non-complementary form of the decoder in FIG. 1;

FIGS. 4a, 4b, and 4c are block diagrams of an adaptive filter in accordance with the invention, the differences in such figures being dependent on whether the adaptive filter is employed in the complementary encoder of FIG. 2a, or as the Y or C filter of the non-complementary encoder of FIG. 2b, or as the Y or C filter of the non-complementary decoder of FIG. 3;

FIG. 7 is a graph of the frequency characteristic of the VDS detector circuit in FIGS. 4a–c;

FIG. 8 shows the non-linear transfer function of the VDS processor circuit in FIG. 6;

DESCRIPTION OF THE PREFERRED EMBODIMENTS

Figure 4A:
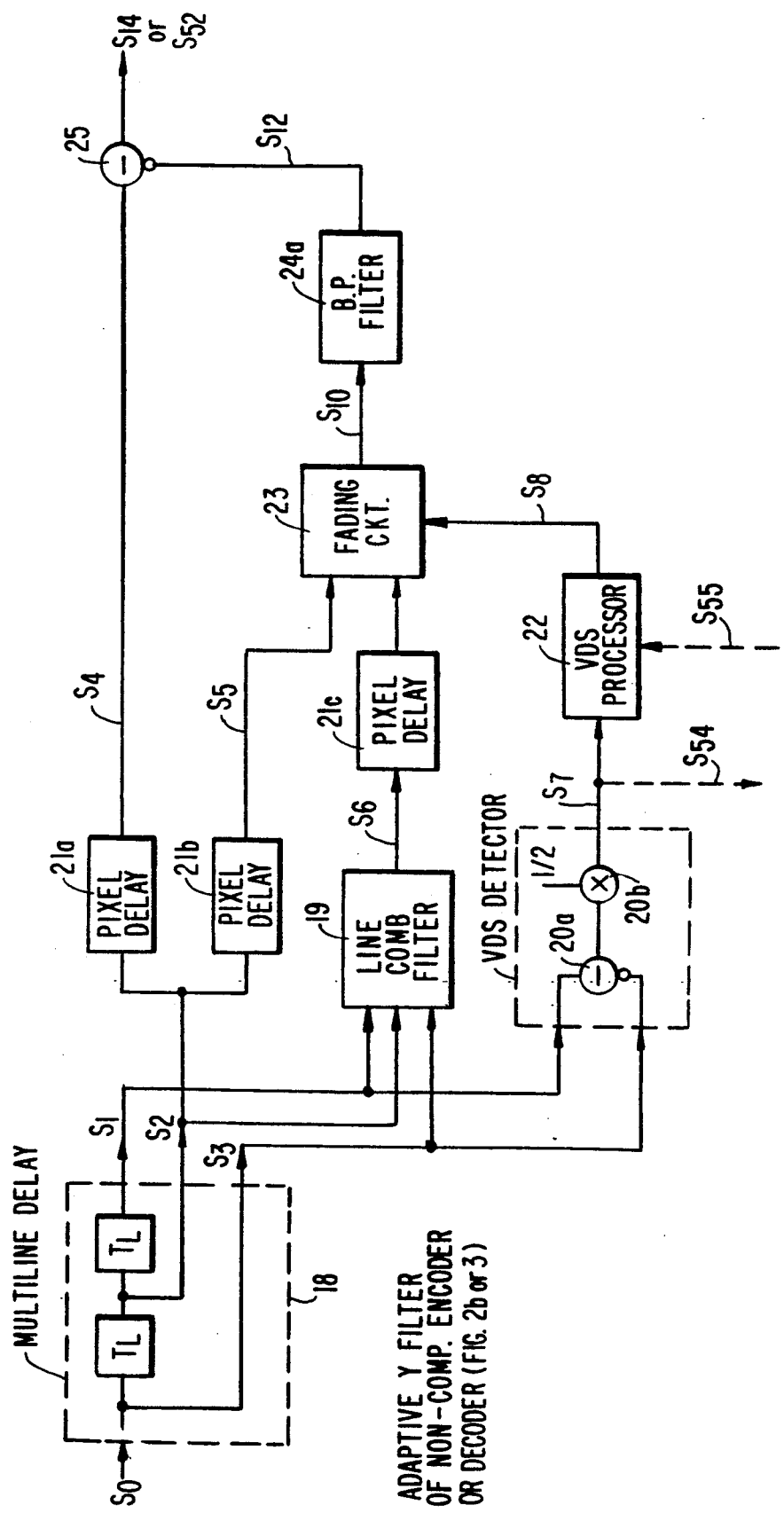

FIG. 1 is an overview of a color television system in accordance with the invention. A conventional video signal source 1 supplies luminance (Y1) and chrominance (C1) signals representing a picture to be transmitted, as derived by an RGB matrixing circuit from, for example, a video camera, photographic film scanner, or video tape or disc reading apparatus. The C1 signal includes the conventional I and Q (or R-Y and B-Y) color-difference signals modulated on a sub-carrier. The Y1 and C1 signals are supplied to encoder 2, a circuit which filters and combines them to form a composite output video signal N1 in accordance with NTSC specifications. The signal N1 is modulated on an RF carrier wave by an RF circuit 3 which then transmits it over a radio or cable transmission path. Additional signal components such as synchronizing pulses and a modulated audio carrier are also conventionally included in the transmitted signal. At the receiver, the received signal is demodulated by an RF circuit 4 to recover the video signal N2 and also the additional signal components. Inasmuch as such additional signal components are not involved in the present invention, and transmission and recovery thereof are well-known in the art, further description in that regard is unnecessary. The received video signal N2 is applied to a decoder circuit 5 which post-filters it to separate and recover the luminance (Y2) and chrominance (C2) components thereof, which can then be supplied to an RGB de-matrixing and video display device 6, such as a CRT, to reproduce the transmitted picture. Preferably, the encoder 2 and decoder 5 are provided with A/D and D/A converters at the inputs and outputs thereof, respectively, so that the signals to be pre-filtered and post-filtered are in digital form and such converters can employ digital signal processing circuits.

FIG. 2a is a block diagram of a complementary form of the encoder 2 in FIG. 1, requiring only one adaptive filter 8. The chrominance signal C1 is subtracted from the luminance signal Y1 by a subtractor 7, resulting in a signal $S_0 = Y1 - C1$, which is supplied to an adaptive filter 8 in accordance with the invention as described in detail hereinafter. The filter 8 produces an output signal $S_{50}$ which is a filtered C1 signal from which frequency components included in the Y1 signal have been eliminated. The Y1 signal is delayed by an adjustable delay element 9, for example a FIFO memory, which equalizes the phase delay of signal $S_{50}$, and the latter signal is subtracted from Y1 by a subtractor 10. This removes from Y1 frequency components which are included in C1, resulting in the signal N1 comprising Y1 and C1 and in which crosstalk between those components has been eliminated or substantially reduced. The encoder in FIG. 2a is termed "complementary" because filtering of the Y1 signal is achieved by subtracting therefrom those frequency components which are of the C1 signal, so that all spectral energy is conserved.

FIG. 2b is a block diagram of a non-complementary encoder and FIG. 3 is a block diagram of a non-complementary decoder. In FIG. 2b the Y1 and C1 signals are applied to respective adaptive filters 14 and 15, which serve to filter from each those frequency components which are included in the other of such signals. As described in more detail hereinafter, a signal $S_{54}$ from Y filter 14 is supplied to C filter 15 and a signal $S_{55}$ from C filter 15 is supplied to Y filter 14. The filtered Y signal $S_{52}$ at the output of filter 14 and the filtered C signal $S_{53}$ at the output of filter 15 are then combined by an adder 12 to obtain the output video signal N1. The decoder in FIG. 3 is similar to the non-complementary encoder in FIG. 2b, but the input is the received video signal N2. It is applied to each of an adaptive Y filter 16 and an adaptive C filter 17, which respectively produce the filtered Y2 and C2 signals. For a decoder, there is no need to interchange signals such as $S_{54}$ and $S_{55}$ as in the encoder filter in FIG. 2b. The decoder could alternatively employ complementary filtering, as in the complementary encoder in FIG. 2a. However, it is preferable to employ non-complementary filters in a decoder because of the greater flexibility that is then possible in design of the filters. From the description herein of the complementary encoder it will be apparent how to design the filters of a complementary decoder.

Figure 4C:
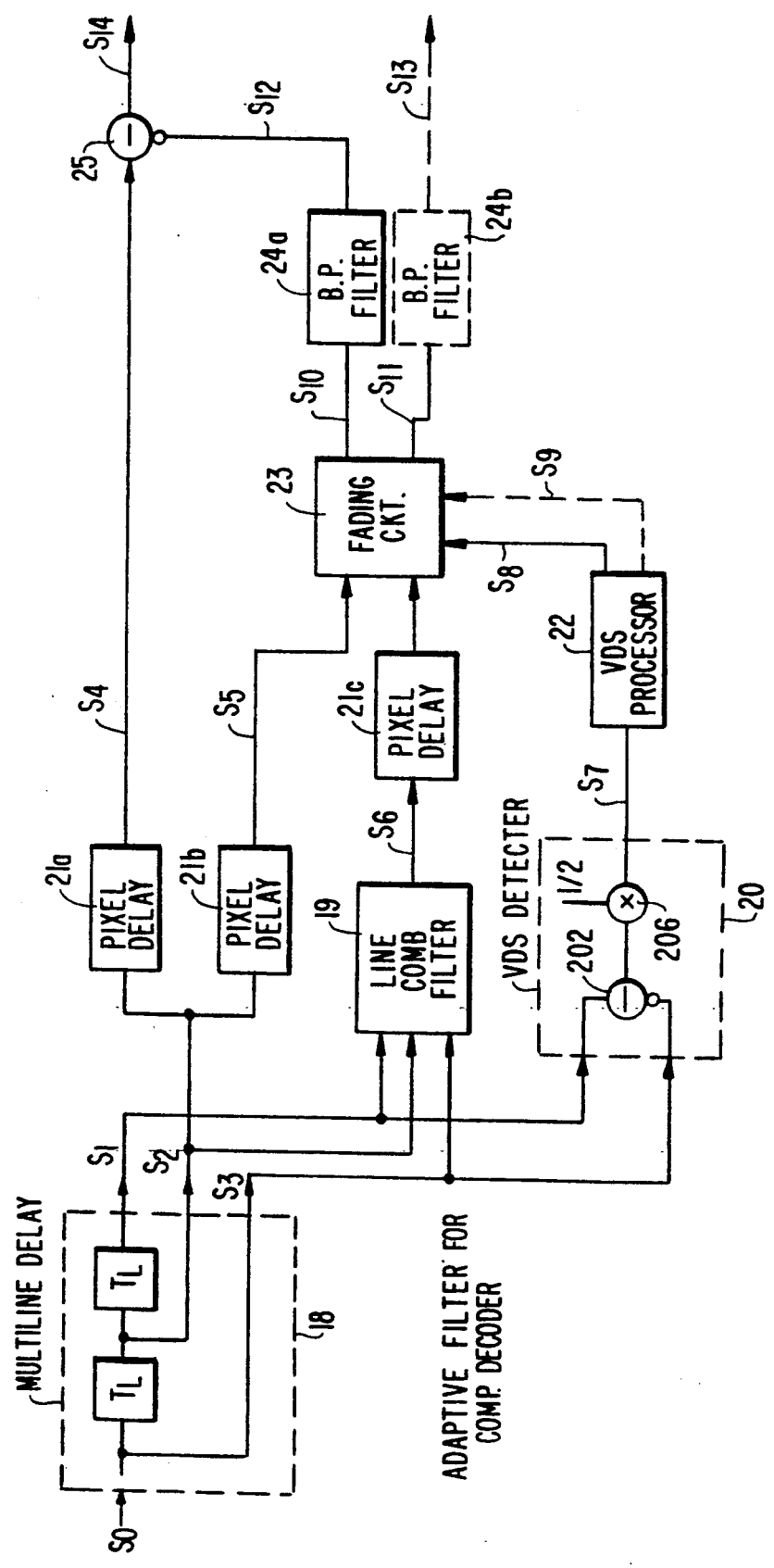

FIGS. 4a–c are block diagrams of the adaptive filters for the encoders and decoder shown in FIGS. 2a, 2b and 3 and also for a complementary decoder, as follows:

FIG. 4a:

the Y filter 14 of the non-complementary encoder in FIG. 2b, in which case the input signal $S_0$ is the signal Y1 in FIG. 2b and the output signal is the signal $S_{52}$ in FIG. 2b; or the Y filter 16 of the non-complementary decoder in FIG. 3, in which case the input signal $S_0$ is the signal (Y2+C2 in FIG. 3 and the output signal is the signal $S_{14}$ in FIG. 3.

FIG. 4b:

the of the non-complementary encoder in FIG. 2b or the C filter 17 of the non-complementary decoder in FIG. 3. In the case of filters 8 and 17 the signals $S_{54}$ and $S_{55}$ are not present. The filter input signal $S_0$ and output signal $S_{13}$ would be the corresponding input and output signals in such related figures.

FIG. 4c:

the adaptive filter for a complementary decoder corresponding to the non-complementary decoded in FIG. 3, the filter input signal $S_0$ being a received video signal N2 as in FIG. 3 and the filter output signals $S_{14}$ and $S_{13}$ respectively being signals Y2 and C2 as in FIG. 3.

The filters in FIGS. 4a–c are similar in structure and operation, corresponding elements being similarly identified. The common functions of such filters will be described with reference to FIG. 4a. Therein the input signal $S_0$ (Y1 of the non-complementary encoder in FIG. 2b, or N2 in the case of the non-complementary decoder in FIG. 3), is applied to a multiline delay circuit 18 comprising two line stores each of which provides a storage period $T_L$ of one scanning line. Consequently, the output signals $S_1$, $S_2$, $S_3$ of multiline delay circuit 18 will be the line signals corresponding to input signals $S_0$ for three successive scanning lines of the video picture. If there is no vertical change in such signals for corresponding pixels on such lines, the C signal will alternate in phase and therefore in sign for such lines. The three line signals $S_1$, $S_2$ and $S_3$ are supplied to respective inputs of a line comb filter 19. The signals $S_1$ and $S_3$ for the first and third lines are also supplied to respective inputs of a vertical difference signal (VDS) detector circuit 20. The line signal $S_2$ for the second line is also applied to each of a pair of pixel delay elements 21a, 21b, and the output $S_6$ of comb filter 19 is applied to a pixel delay element 21c. Such pixel delay elements equalize the phase delays of the signals in the various branches of the circuit in FIG. 4a.

Figure 5A:
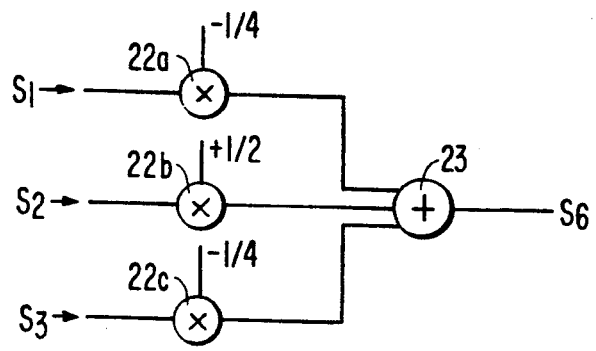
FIGS. 5a and 5b are alternative embodiments of the line comb filter in FIGS. 4a–c.
Figure 5B:
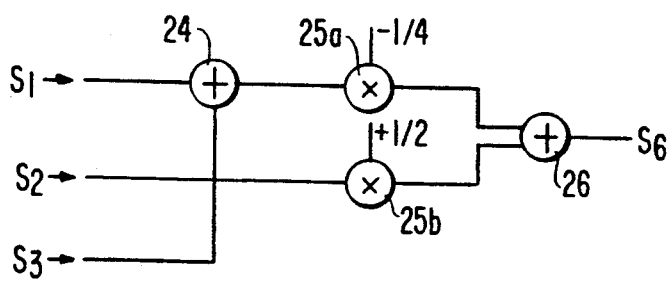

Two alternative implementations of line comb filter 19 are shown in FIGS. 5a and 5b. In FIG. 5a the line signals $S_1$, $S_2$ and $S_3$ are respectively applied to multiplier or barrel shift (a shift of bit position) units 22a, 22b, and 22c wherein they are respectively multiplied by constant factors in the proportions $-\frac{1}{4} + \frac{1}{2}$ and $-\frac{1}{4}$, and the products are summed by adder 23 to produce output signal $S_6$. If the filter input signal $S_0$ is $Y1-C1$, the line signals $S_1$, $S_2$, $S_3$ will therefore be $Y1-C1$, $Y1+C1$, $Y1-C1$. The described summation will therefore eliminate Y1, resulting in an output signal $S_6$ which is just C1. In the alternative embodiment in FIG. 5b, the inputs $S_1$ and $S_3$ are summed by adder 24, and such sum and input $S_2$ are respectively applied to multiplier or barrel shift units 25a, 25b wherein they are multiplied by constant factors in the proportions - ¼ and ½, and the resulting products are summed by adder 26 to produce output signal $S_6$. If the signals on the filter inputs are as described above for the filter in FIG. 5a, output signal $S_6$ will again be C.

In the case where the filter in FIG. 4a serves as the Y filter of the non-complementary encoder in FIG. 2b the filter input signal $S_0$ will be just the signal Y1 in FIG. 2b, which includes frequency components belonging to signal C1. In that case the above-described operation of the line comb filter 19 will result in an output signal $S_6$ which is $Y_1$ filtered of frequency components thereof belonging to C1.

In FIG. 4b, in the case where the filter therein is the C filter of the non-complementary encoder in FIG. 2b, the filter input signal $S_0$ will be the signal C1 in FIG. 2b and which includes frequency components belonging to signal Y1. In that case the above-described operation of line comb filter 19 will result in an output signal $S_6$ which comprises just the frequency which belong to C1. Consequently, subtraction of signal $S_6$ from $Y_1$ will derive $Y_1$ filtered of such frequency components. This operation is described in more detail hereinafter.

Figure 5C:
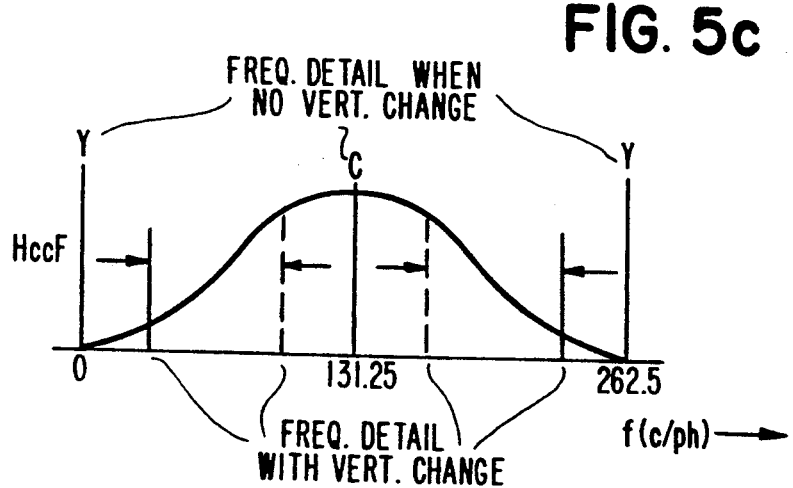
FIG. 5c shows the frequency transfer characteristic of such comb filter.

A more complete understanding of the operation of the line comb filter in each of FIGS. 5a and 5b can be had from FIG. 5c, showing the frequency transfer characteristic $H_{CCF}$ of such filter relative to a normalized frequency of cycles per picture height. With an interlaced scanning line raster of 525 line, there will be 262.5 cycles during each vertical field of the picture, referred to herein as cycles per picture height (c/ph). If there is no vertical change in the picture from line-to-line during a vertical field, the luminance signal Y will consist of sidebands clustered at 0 and 262.5 c/ph and the chrominance signal C will consist of sidebands clustered at 131.25 c/ph. Consequently, the frequency transfer characteristic in FIG. 5c will effectively comb the frequency components of the Y signal from the composite video signal, resulting in a C signal free of crosstalk from the Y signal. However, on horizontal or diagonal colored edges, which create color transitions in the vertical or diagonal direction, the Y and C signal sidebands shift as shown in FIG. 5c and so the frequency transfer characteristic results in considerable overlap of frequency components of the Y and C signals. Consequently, the line comb filter should not be applied for pictures having very low vertical correlation.

Vertical correlation adaptive utilization of the comb filtered signal is provided by first deriving a vertical difference signal (VDS) corresponding to vertical changes in the video picture during each vertical field. That function is performed by the VDS detector 20 in FIG. 4a, wherein the signals $S_1$ and $S_3$ are subtracted by a subtractor 20a and the resulting difference is halved by a multiplier 20b. Since the signals $S_1$ and $S_3$ are two lines apart, the output signal $S_7$ from detector 20 will correspond to the average change in the picture in the vertical direction between those lines. The frequency characteristic $H_{vds}$ of VDS detector 20 is shown in FIG. 7. It is zero at the frequencies at which the Y and C signal components are located when there is no vertical change in the picture, and gradually increases up to a maximum at the intermediate frequency to which those signal components are shifted when there is a maximum vertical change in picture content. Thus, frequency components $f_y$ which represent vertical changes in the picture migrate into the passbands of the frequency characteristic of detector 20 and result in the VDS signal denoted $S_7$ in FIG. 4a which is utilized to control the relative proportioning of the comb filtered component of the output of the adaptive filter.

Figure 6:
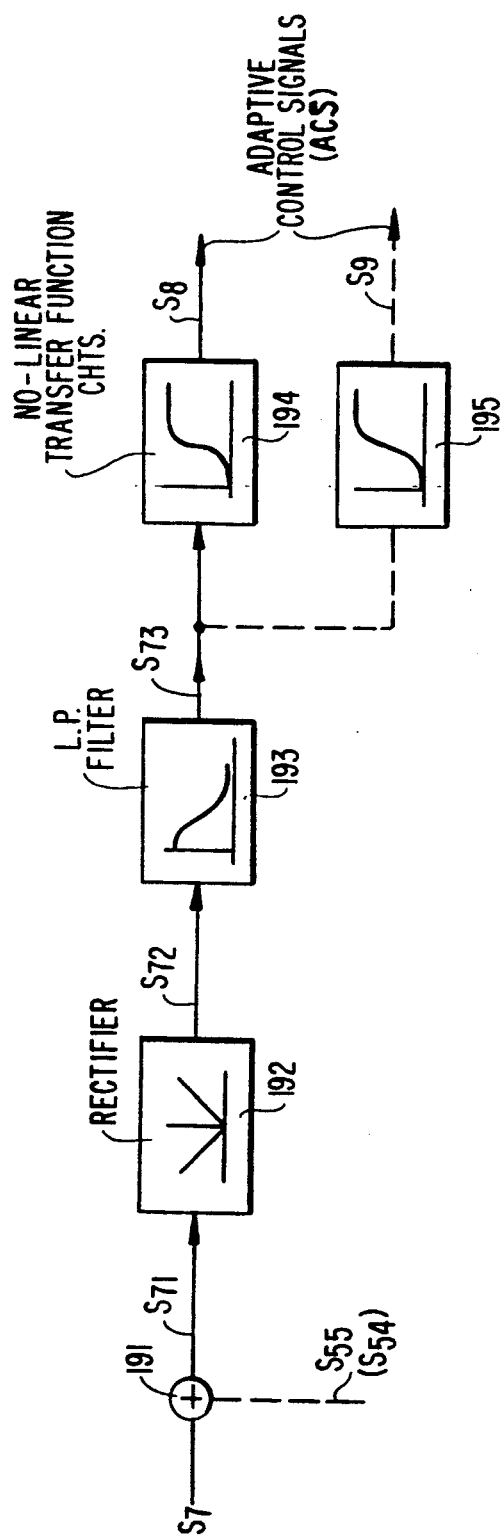
FIG. 6 is a block diagram of the VDS processor circuit in FIGS. 4a–c.

Before the VDS signal can be used to control the degree of adaptive filtering it must be processed further, as was pointed out in Applicant's above-cited article published in 1986. For example, periodic changes in vertical detail in the picture will result in a periodic VDS signal whereas such signal should only be proportional to the amplitude of such changes. The VDS signal $S_7$ is therefore applied to the VDS processor circuit 22 in FIG. 4a, and which is shown in more detail in FIG. 6. Signal $S_7$ is applied to an adder 191 the output $S_{71}$ of which is supplied to a rectifier 192 producing a unipolar signal $S_{72}$ which is low-pass filtered by a filter 193 to provide a smoothed output signal $S_{73}$ having low ripple even if input signal $S_7$ may be periodic. The signal $S_{73}$ is applied to a circuit 194 having a nonlinear transfer function as shown in FIG. 8, resulting in an output signal $S_8$. For a non-complementary encoder according to FIG. 2b, having separate filters for the Y and C signal components, the VDS signal $S_7$ at the output of the VDS detector 20 of each such filter will also be supplied to the adder 191 at the input to the VDS processor in the filter for the other of such signals, so as to combine both VDS signals into the signal $S_{71}$ in FIG. 6 which is then processed. In this way, processing of the respective luminance and chrominance components each takes into account vertical changes in both luminance and chrominance. The dotted line $S_{55}$ in FIG. 6 denotes the VDS signal $S_{55}$ which will be supplied from the VDS detector of the adaptive filter for the C signal when the processor in FIG. 6 is the Y processor. If the processor in FIG. 6 is the C processor, then such dotted line would signify the VDS signal $S_{54}$ supplied from the Y processor. The second non-linear transfer circuit 195 in FIG. 6 and the dotted line thereto for signal $S_{73}$ represents the case in which FIG. 6 is the processor in the C filter, and such processor will also have a non-linear transfer function as in FIG. 8 resulting in an output signal $S_9$. The signals $S_8$ and $S_9$ are the adaptive control signals (ACS) for controlling fading circuit 23 in FIGS. 4a–4c.

It should be particularly noted that since the adaptive control signals (ACS) are derived by the same non-linear transfer functions and processing parameters at both the encoder and decoder, coordination is achieved at the transmitter and receiver without necessitating transmission of any special control signal to the receiver for that purpose.

Figure 9:
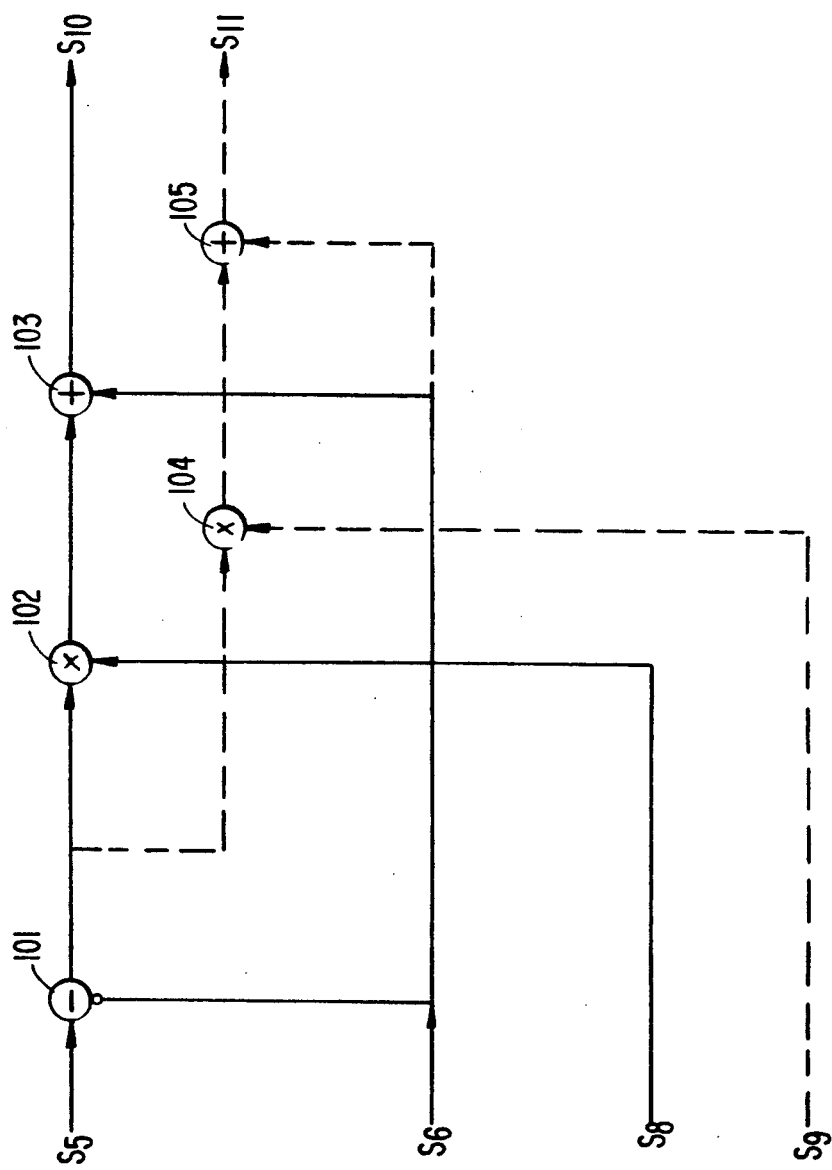
FIG. 9 is a block diagram of the fading circuit in FIGS. 4a–c.

The adaptive fading circuit 23 in FIGS. 4a–c is shown in FIG. 9, wherein the dotted lines are applicable only in the case where such circuit is employed in a non-complementary encoder as in FIG. 4c, which provides an ACS signal $S_9$ as well as an ACS signal $S_8$ as described above with reference to the VDS processor in FIG. 6. In the case of a decoder, the signals $S_9$ and $S_{11}$ in FIG. 10 will not be present. The input signal $S_5$, which is the delayed unfiltered line signal $S_2$ including the Y and C signal components, and the input signal $S_6$, which is a comb filtered signal such as the filtered C signal component, are applied to a subtractor circuit 101. The result of such subtraction is multiplied by a factor corresponding to the magnitude of ACS signal $S_8$ by means of a multiplier 102. The so-multiplied signal is then added to the signal $S_6$ by an adder 103, the resulting sum signal $S_{10}$ effectively being a mixture of signals $S_5$ and $S_6$ in proportions determined by the magnitude of ACS signal $S_8$. In the non-complementary decoder case, wherein there will also be a second control signal $S_9$, it is similarly combined with signals $S_5$ and $S_6$ by means of a multiplier 104 and adder 105 to produce a resulting sum signal $S_{11}$ which represents a mixture of signals $S_5$ and $S_6$ in proportions determined by the magnitude of signal $S_9$. Thus, signals $S_8$ and $S_9$ provide an adaptive variable proportioning or "fading" of the combination of signals $S_5$ and $S_6$. If, for example, the ACS signal $S_8$ is zero, as will occur when the processed VDS signal $S_{72}$ is below the lower threshold FL of the non-linear transfer function in FIG. 8 of the VDS processor circuit in FIG. 6, the output signal $S_{10}$ of the fading circuit in FIG. 10 will be just the delayed line-combed signal $S_6$ provided by line-combed filter 17 in FIGS. 4a–4c at the input of fading circuit 23. If the ACS signal $S_8$ is at its maximum value, as will occur when the processed VDS signal $S_{72}$ is at or above the upper threshold FH of the non-linear transfer function in FIG. 8, the output signal $S_{10}$ of fading circuit 23 will be just the signal $S_5$ which is the delayed second line signal $S_2$ in FIGS. 4a–4c. Between those extremes, dependent on the magnitude of the ACS signal, a variable degree of mixing or "fading" is produced of comb filtered line signal $S_6$ with unfiltered line signal $S_5$ in varying proportions. Thus, the contribution of the comb filtered signal to the output of fading circuit 23 is faded out upon occurrence of high frequency vertical components in the line signals $S_1$ and $S_2$ and $S_3$ signifying sudden vertical changes in the scanning lines corresponding thereto.

Referring back to FIGS. 4b–4c, in the case of a complementary encoder as in FIG. 2a only one adaptive filter as in FIG. 4a is required. Consequently in FIG. 4a the signal $S_{10}$ at the output of fading circuit 23 carries both luminance and chrominance information. The band-limited output signals $S_{13}$ from bandpass filter 24a is then the filter output signal $S_{50}$ in FIG. 2a. In the case of the Y-filter of the non-complementary encoder in FIG. 2b, which filter is shown in FIG. 4a, therein the band-limited output signal $S_{12}$ from bandpass filter 24a is supplied to the subtractive input of a subtractor 25. The other input of subtractor 25 is coupled to line signal $S_2$ by pixel delay 21a, so that the delayed signal $S_4$ at such input has the same phase delay as the signal $S_{12}$. The result of the subtraction performed by subtractor 25 is the output signal $S_{14}$ of the adaptive filter.

In FIG. 4c (the filter for a complementary decoder) the output signal $S_{10}$ of the fading circuit of the Y filter and the output signal $S_{11}$ of the fading circuit for the C filter are respectively supplied to respective bandpass filters 24a and 24b. Each such filter has a passband centered at the color subcarrier frequency and a bandwidth approximating the 3 to 4.2 MHz chrominance bandwidth of an NTSC video signal, although such filters may have somewhat different bandwidths in order to reduce spectral overlap of the luminance and chrominance passbands. The output signal $S_{13}$ from bandpass filter 24b is the output of the C filter of the decoder, which will a signal C2 as in FIG. 3. The output signal $S_{12}$ from bandpass filter 24a of the Y filter of the decoder is subtracted by subtractor 25 from the phase adjusted line signal $S_4$, resulting in an output signal $S_{14}$ which is the output of the Y filter and so will be a signal Y2 in FIG. 3.

Figure 10A:
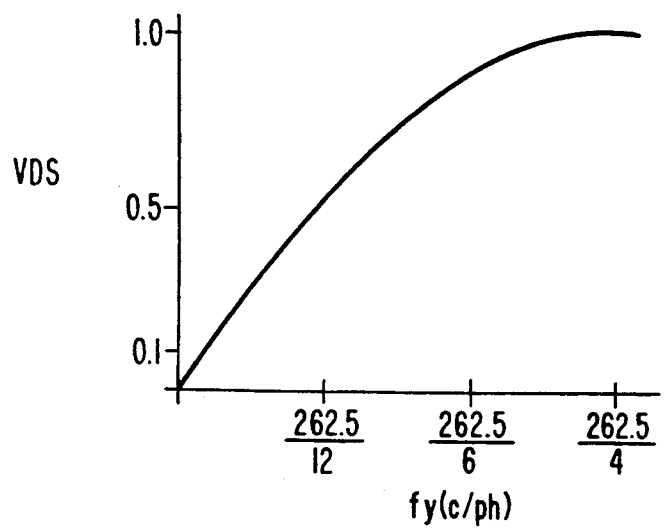
FIG. 10a is a graph of the frequency characteristic of the VDS signal produced by the detector circuit in FIGS. 4a–c, and FIGS. 10b and 10c illustrate various different non-linear frequency characteristics of the ACS signal produced by the VDS processor in FIGS. 4a–c.
Figure 10B:
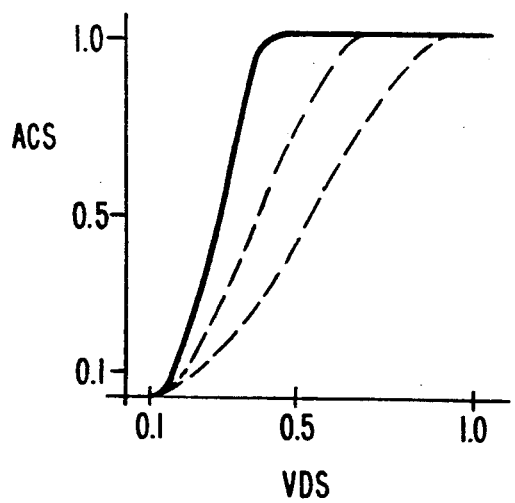
Figure 10C:
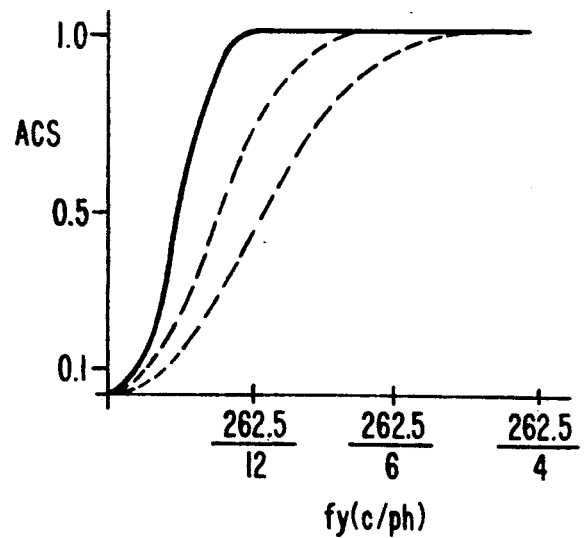
Figure 11:
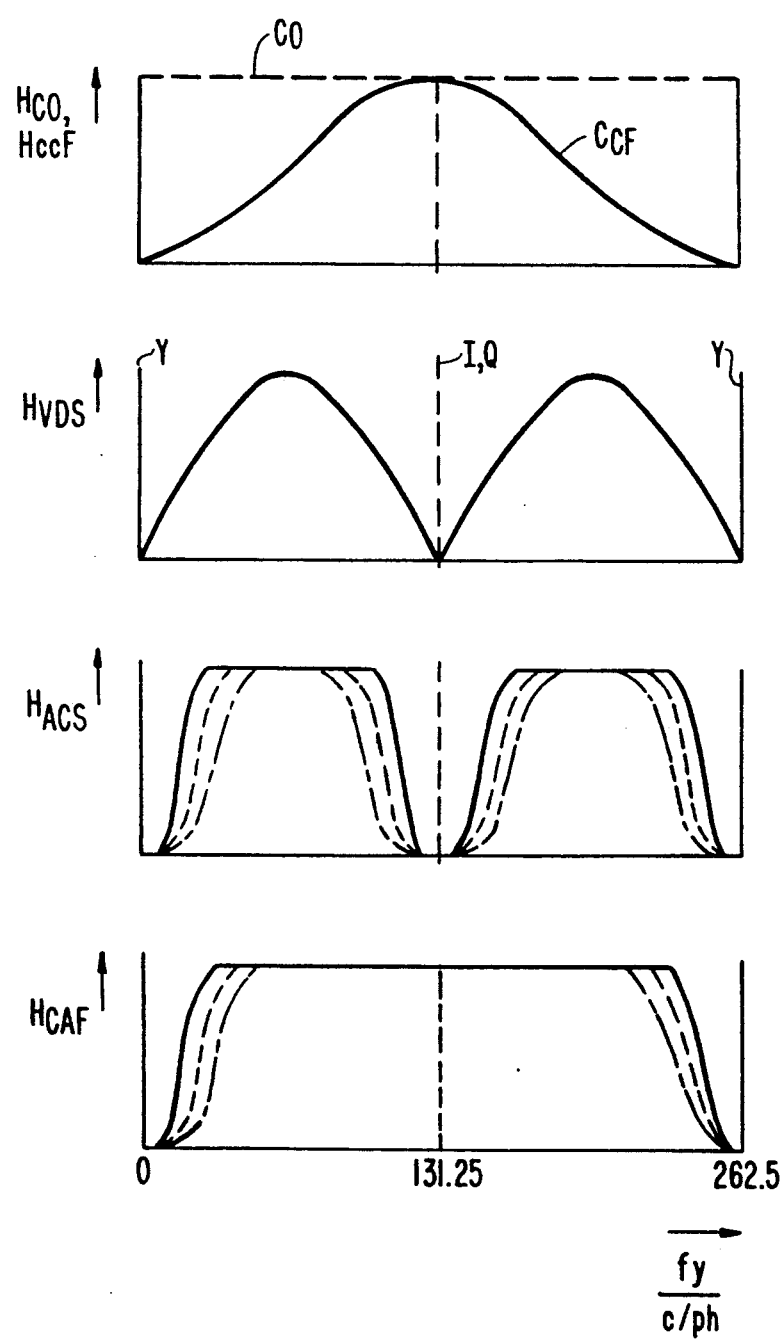
FIGS. 11 and 12a–12e are graphs of various frequency characteristics of an adaptive filter in accordance with the invention.

The operation of adaptive filtering according to the invention is illustrated in FIGS. 10–12. FIGS. 10b and 10c show how the vertical detection signal VDS is converted into the adaptive control signal ACS via several different possible non-linear transfer functions. Such functions are readily generated by 10a shows the amplitude of the detected VDS signal as a function of the vertical frequency fy. The amplitude is dependent on the occurrence of vertical detail (changes in the picture in the vertical direction). Since the VDS signal is fed to the inputs of the non-linear transfer function circuits 194 and 195 in FIG. 6 (after rectification in rectifier 192 and lowpass filtering in filter 193) the output ACS signal of each of such circuits consists of modified amplitude values of the VDS signal as shown in FIGS. 10b and 10c.

In FIGS. 10a to 10c a maximum peak-to-peak value of the input signal is assumed. As illustrated, a change in the adaptive control signal (ACS) is possible by changing the shape of the transfer function. With a steep transfer function a sudden change of ACS level is produced as the vertical frequency components increase. With smooth functions the change in ACS level is also smooth, resulting in a gradual fading operation. If the thresholds $T_L$ and $T_H$ of the non-linear transfer function in FIG. 8 are relatively low, the fading or reduction of the proportion of comb filtering will commence at relatively low values of vertical frequency fy.

The effect of different adaptive control signals on the bandwidth of the chrominance signal is illustrated in FIGS. 11, in which $H_{CO}$ refers to the unfiltered signal, $H_{CCF}$ is the amplitude response of the comb filter as shown in FIG. 5c, $H_{VDS}$ is the amplitude response of the VDS detector the frequency response of which is shown in FIG. 7, $H_{ACS}$ is the shaped amplitude response of the VDS signal after processing, and $H_{CAF}$ is the chrominance passband after adaptive filtering and which is calculated from the following equation applicable to the adaptive fading circuit:

$$H_{CAF} = H_{CCF} + H_{ACS}(H_{CO} - H_{CCF})$$

It is to be noted that due to the processing steps in FIG. 6 maximum values of the VDS and ACS signals, respectively, will result in equal amplitudes of the frequency responses $H_{VDS}$ and $H_{ACS}$. For this reason, the graphs of $H_{VDS}$ and $H_{ACS}$ in FIG. 11 can be recognized partly in FIG. 10b and 10c, respectively.

With varying transfer functions according to FIG. 10b and 10c a variation of bandwidths is achieved and the slopes of the filter passbands are steeper than they are with non-adaptive comb filtering, as a comparison of $H_{CCF}$ and $H_{CAF}$ in FIG. 11 clearly shows.

One example of utilization of variable passbands with steep slopes is illustrated in FIGS. 12a–e, showing the cross-talk reduction which is achieved by an adjustment of the adaptive filter behavior of an encoder and decoder. In such figures, $H_{E/Y}$ denominates the encoder luminance frequency response and $H_{E/C}$ is the encoder chrominance frequency response. $H_{D/Y}$ is the decoder luminance frequency response and $H_{D/C}$ the decoder chrominance response. $H_{CY}$ and $H_{CC}$ indicate the amount of residual cross-luminance and cross-color components, respectively. In this example, complementary adaptive filters are employed at the decoder. Consequently, $H_{E/Y}=1-H_{E/C}$.

At the decoder, non-complementary filtering is preferably employed, which provides less spectral overlap.

Figure 12A:
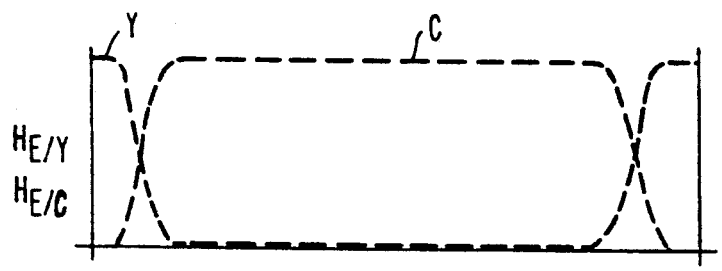
Figure 12B:
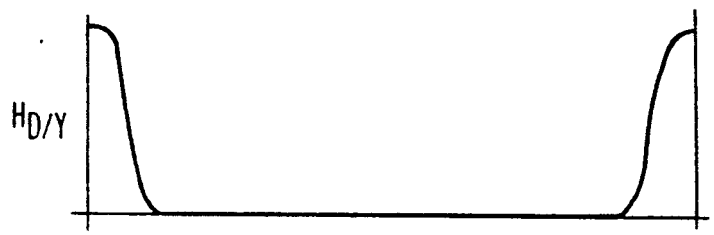
Figure 12C:
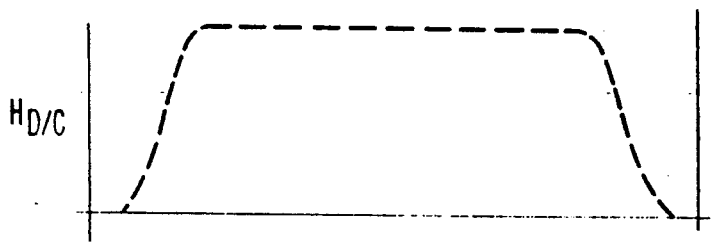
Figure 12D:
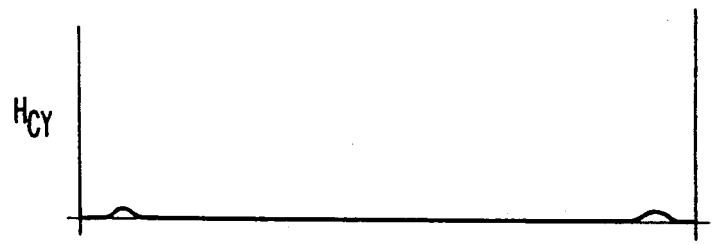
Figure 12E:
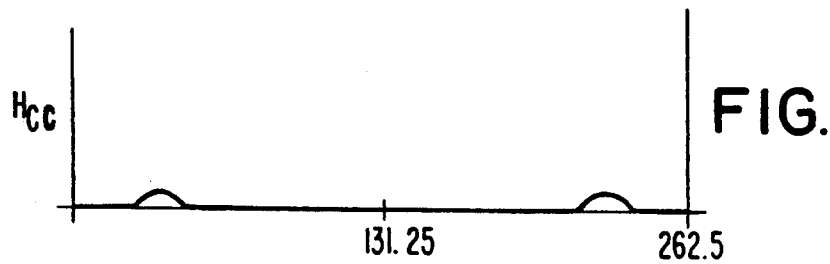

The cross-luminance function $H_{CY}$ in FIG. 12b is given by $H_{CY}=H_{E/C}\cdot H_{D/Y}$
whereas the cross-chrominance function $H_{CC}$ is given by $H_{CC}=H_{E/Y}\cdot H_{D/C}$.

Due to the shapes of the pass-bands of the non-complementary decoder filters, cross-talk components are reduced substantially. The area of residual overlap of the encoded Y and C components can be disregarded because due to the steep filter slopes this area is very small, resulting in only a small waste of spectrum. The loss of resolution of the luminance and chrominance signals is therefore also very small.

It will be clear from the above description that different shapes of the filter passbands can be achieved by a variation of the adaptive filter ACS signal. Therefore, a reduction of cross-talk is achievable which is even more complete than that shown in the example of FIG. 12. On the other hand, in certain applications a higher level of cross-talk is acceptable and permits use of more gradual filter slopes. This has the advantage of slightly better resolution of luminance and chrominance.

Besides use in a transmission system which includes both pre- and post-filtering at the encoder and decoder, respectively, the basic teachings of the invention can also be usefully applied for encoding alone or for decoding alone. In such cases, different adaptive adjustments of the filter may be desirable.

While the invention has been described with reference to certain preferred embodiments thereof, it will be apparent to those skilled in the art that various modifications and adaptations thereof may be made without departing from the teachings and scope of the invention as defined in the ensuing claims.

What is claimed is:

1. In a color television system which includes a transmitter and a receiver and wherein a color video signal is transmitted having luminance (Y) and chrominance (C) components for each of successive pixels on successive scanning lines of a video picture, the C signal having a frequency band overlapping part of the frequency band of the Y signal, the Y signal and C signal respectively including frequencies which are clustered at respectively different harmonics of the scanning line frequency for portions of the video picture having high vertical correlation, such harmonic frequencies shifting so as to increasingly overlap in portions of the video picture having increasingly less vertical correlation;

said transmitter including an encoder for combining the Y and C signals to form the transmitted video signal, and said receiver including a decoder for deriving the Y and C signals from the received video signal; the improvement characterized in that:

said encoder comprises at least one adaptive filter to which one of said Y and C signals is supplied as an input, and said decoder comprises at least one adaptive filter to which the received video signal is supplied as an input, each of said adaptive filters comprising:

a multiline delay for receiving the input signal to such filter and deriving therefrom respective line signals corresponding thereto for respective ones of a plurality of successive scanning lines of the video picture;

a line comb filter for receiving said line signals and deriving therefrom a comb-filtered signal which only includes those frequency components of the line signals having a particular phase relationship on said successive scanning lines;

a fading circuit for receiving said comb-filtered signal and one of said line signals and combining them in variable relative proportions to derive a corrected signal, such variable proportioning ranging between a corrected signal consisting of only said comb-filtered signal and a corrected signal consisting of only said one line signal;

a detector circuit for deriving from said line signals a vertical difference signal (VDS) of a magnitude corresponding to the degree of vertical correlation of said line signals;

a processor circuit for deriving from said VDS signal an adaptive control signal (ACS) for controlling said fading circuit to establish said relative proportioning in accordance with the magnitude of said ACS signal; and means including a bandpass filter for combining said one line signal with said corrected signal produced by said fading circuit so as to derive an output signal constituting the output of said adaptive filter, said output signal being said one line signal comb-filtered to a maximum extent consistent with the degree of vertical correlation of said line signals.

2. A color television system as claimed in claim 1, wherein the line comb filter of the adaptive filter in said encoder is adapted to filter from the input signal thereto frequency components which alternate in phase on successive scanning lines of the video picture.

3. A color television system as claimed in claim 1, wherein the line comb filter of the adaptive filter in said encoder is adapted to filter from the input signal thereto frequency components thereof which are of the same phase on successive scanning lines of the video picture.

4. A color television system as claimed in claim 1, wherein said encoder and said decoder each comprise a pair of adaptive filters, the Y and C signals being respectively applied as inputs to the respective adaptive filters of said encoder and the received video signal being applied as an input to each of the adaptive filters of said decoder; one of the adaptive filters of said decoder producing an output equivalent to said Y signal comb-filtered of frequency components of said C signal, and the second of the adaptive filters of said decoder producing an output equivalent to said C signal comb-filtered of frequency components of said Y signal.

5. A color television system as claimed in claim 1, wherein said VDS signal derived by said detector circuit is substantially zero when there is no substantial difference between said line signals for vertically corresponding pixels on the scanning lines to which said line signals relate, and which gradually increases up to a predetermined maximum value in response to increasing differences between said line signals for such vertically corresponding pixels.

6. A color television system as claimed in claim 5, wherein said processor circuit is adapted to rectify the VDS signal, low-pass filter the rectified signal, and derive said ACS signal from said low-pass filtered signal in accordance with a pre-selected non-linear transfer characteristic.

7. A color television system as claimed in claim 4, wherein the processor circuit in each of the adaptive filters of said encoder receives as an input thereto the output of the detector circuit in such adaptive filter combined with the output of the detector circuit of the other of said adaptive filters.

8. A color television system as claimed in claim 5, wherein said fading circuit comprises a plurality of digital logic circuits for effecting a predetermined logical combination of said comb-filtered signal and said one line signal in proportions corresponding to the magnitude of said ACS signal.

9. A color television system as claimed in claim 4, wherein the processor circuits in each of said pairs of adaptive filters have different non-linear transfer characteristics.

10. A color television system as claimed in claim 6, wherein the non-linear transfer characteristic of said processor circuit produces an ACS signal which controls said fading circuit to provide a pre-selected bandwidth of said output signal of said adaptive filter.

* * * * *